Figure 1:
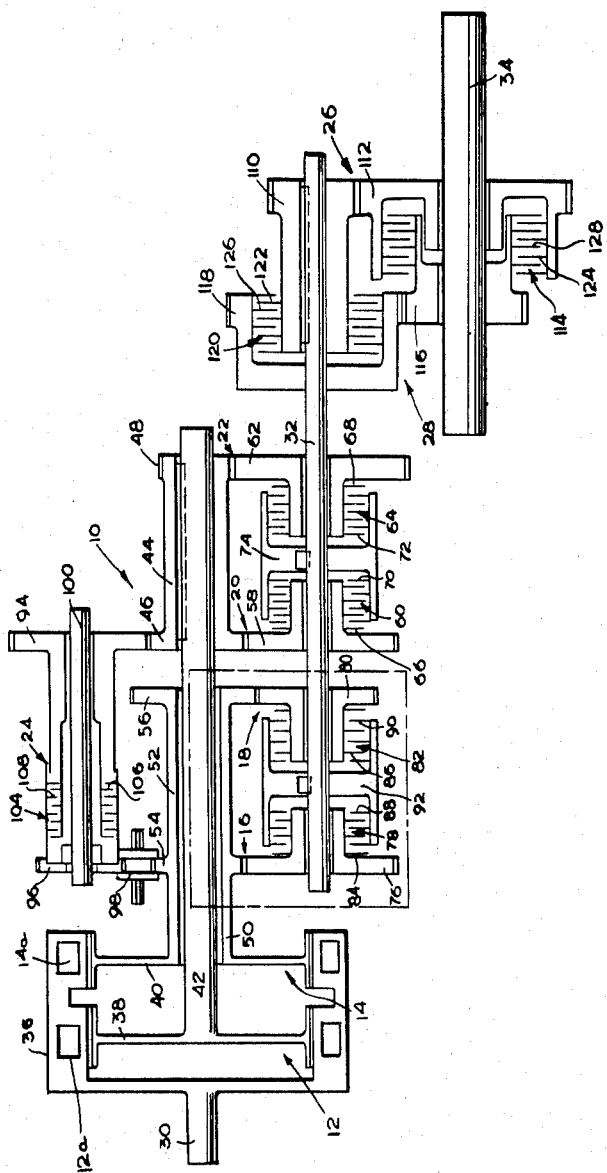

May 20, 1958 W. F. DOUBLE 2,835,137
TRANSMISSION – FRICTION CLUTCH ARRANGEMENT
Filed July 9, 1954 2 Sheets-Sheet 1

INVENTOR.
WALTER F. DOUBLE
BY
Hyde, Meyer, Baldwin & Doran
ATTORNEYS

May 20, 1958 W. F. DOUBLE 2,835,137
TRANSMISSION – FRICTION CLUTCH ARRANGEMENT
Filed July 9, 1954 2 Sheets-Sheet 2

INVENTOR.
WALTER F. DOUBLE
BY
Hyde, Meyer, Baldwin & Doran
ATTORNEYS

United States Patent Office 2,835,137
Patented May 20, 1958

2,835,137

TRANSMISSION-FRICTION CLUTCH ARRANGEMENT

Walter F. Double, Willoughby, Ohio, assignor to General Motors Corporation, Detroit, Mich., a corporation of Delaware Application July 9, 1954, Serial No. 442,237

1 Claim. (Cl. 74—364)

This invention relates to improvements in a clutch utilized in connection with change of gear ratios in a transmission.

The clutch construction of this application may be utilized in the transmission disclosed in the copending application of Walter F. Double et al., Serial No. 426,114, filed April 28, 1954, now Patent No. 2,723,567 dated November 15, 1955, although it has other uses also.

It is an object of the present invention to provide a clutch structure utilizing a shaft, an output member surrounding the shaft and drivingly engaged with it, a gear rotatably mounted on the shaft, there being a cylinder chamber formed in the output member with piston means reciprocatably mounted in the chamber, the coacting clutch elements being drivingly connected with this gear and with the output member respectively, these elements being mounted for movement into and out of driving engagement with each other and the piston means being arranged to control the movement of the clutch elements into and out of engagement.

Another object of the present invention is to provide a double clutch arrangement adapted to alternatively connect a clutch to drivingly cooperate with one or the other of a pair of gears in a cluster arrangement whereby a common output member is keyed to the output shaft, a pair of gears continuously meshes with the two gears of the cluster set, the output gear being rotatably mounted on the output shaft, a common support member for the two clutches positioned between the two gears of the cluster arrangement, each clutch having a plurality of plates arranged in two sets, one set being splined to the output member, the other set being splined to its respective output gear and cylinder and piston means in the output member arranged to drivingly engage one or the other sets of plates depending upon which gear is to be used for driving the output shaft.

Still another object of the present invention is to provide a double clutch of the type described in the preceding paragraph including a radially extending partition member between the two clutches with pressure fluid passageways in the output shaft and in the partition arranged to conduct pressure fluid behind one or the other of the pistons in order to engage one or the other of the two clutches.

Still a further object of the present invention is to provide a very compact arrangement of the clutch and gears described above with suitable arrangement of the parts for sturdy construction and long and effective working life.

Other objects and advantages of the invention will be disclosed in connection with the specification and drawings and the essential features thereof will be set forth in the appended claim.

Figure 2:
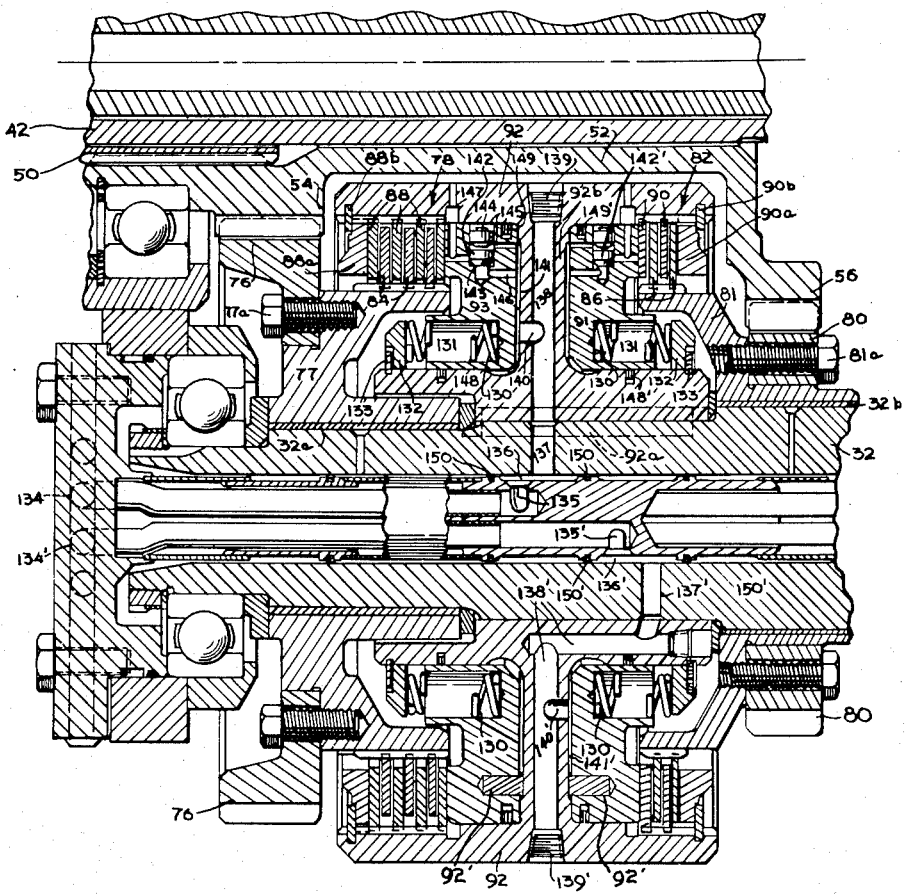

In the drawings,

Fig. 1 is a diagrammatic view indicating a ladder-type transmission in which the present invention is adapted to be used; while Fig. 2 is an enlarged detail sectional view of that portion of Fig. 1 enclosed in dot-dash lines, the view of Fig. 2 being taken along a plane passing axially through shaft 32 of Fig. 1.

Referring to Fig. 1 of the drawings 10 represents generally a multiple forward and reverse speed transmission comprising basically a pair of main power input clutches 12 and 14, gear sets 16, 18, 20 and 22, reverse gear cluster 24, auxiliary gear sets 26 and 28, and input, intermediate and output shafts 30, 32 and 34 respectively.

Input shaft 30 has affixed thereto a drum member 36 constituting an input or driving member of both clutches 12 and 14.

Clutches 12 and 14 are preferably of the eddy current electromagnetic type and comprise in addition to the input member 36, rotor or output members 38 and 40 respectively. Output member 38 includes an output shaft 42 having a gear cluster 44 fixedly secured thereon, comprising axially spaced gears 46 and 48 whereas output member 40 includes a quill shaft 50, encircling shaft 42, having a gear cluster 52 thereon, comprising axially spaced gears 54 and 56.

Gear 46 constituting a part of gear set 20 meshes with a gear 58, forming the other part thereof, and gear 58 is in turn adapted to be coupled to intermediate shaft 32 by way of a friction clutch 60. Gear 48, of gear cluster 44, constituting a part of gear set 22 meshes with a gear 62, forming the other part thereof, and gear 62 is in turn adapted to be coupled to intermediate shaft 32 by way of a friction clutch 64. Both clutches 60 and 64 as shown are of the multiple plate type and include respectively input plates 66 and 68 connected to the respective gears 58 and 62, and output plates 70 and 72 respectively connected to a common support 74 having keyed relation with intermediate shaft 32.

Gear 54 constituting a part of gear set 16, meshes with a gear 76, forming the other part thereof, and gear 76 is in turn adapted to be coupled to intermediate shaft 32 by way of a friction clutch 78. Gear 56, of gear cluster 52, constituting a part of gear set 18, meshes with a gear 80, forming the other part thereof, and gear 80 is in turn adapted to be coupled to intermediate shaft 32 by way of a friction clutch 82. Both clutches 78 and 82 are identical to clutch 60 and 64 and include input plates 84 and 86 connected to the respective gears 76 and 80, and output plates 88 and 90 respectively connected to a common support 92 having keyed relation with intermediate shaft 32.

Reverse gear cluster 24 includes a gear 94 having meshing relation with gear 46 and gear 96 having meshing relation with a reverse idler gear 98, said idler gear in turn meshing with gear 54 of gear cluster 52. Gears 94 and 96 are supported for rotation on jack shaft 100 and are adapted to be coupled together by a friction clutch 104. The clutch 104 includes engageable plates 106 and 108 connected respectively to the gears 94 and 96.

Auxiliary gear sets 26 and 28 as combined constitute an auxiliary gear box for transmission 10.

Friction clutches 60, 64, 78, 82, 104, 114 and 120 can be actuated by any of several conventional means, such as hydraulically, vacuum, or electricity; hydraulic operation under electrical control being hereinafter described.

For the purpose of achieving eight forward as well as eight reverse speeds the gears are required to be predetermined as to size, for example wherein meshing gears 54 and 76 are provided with 26 and 46 teeth respectively, meshing gears 56 and 80 are provided with 39 and 33 teeth respectively, meshing gears 46 and 58 are provided with 32 and 40 teeth respectively, meshing gears 48 and 62 are provided with 20 and 52 teeth respectively, meshing gears 110 and 112 are provided with 24 and 79 teeth respectively, meshing gears 118 and 116 are provided with 59 and 44 teeth respectively, reverse gear 96 is provided with 32 teeth and reverse gear 94 is provided with 40 teeth.

The first forward speed of the transmission is obtained through an energization of clutch 12, engagement of clutch 64 and engagement of clutch 114 such that power flows by way of clutch 12, output member 38, shaft 42, gear cluster 44, meshing gears 48 and 62, engageable plates 66 and 72 of clutch 64, member 74, shaft 32, meshing gears 110 and 112, engageable plates 124 and 128 of clutch 114, gear 116 and output shaft 34. Second forward speed is next obtained by de-energizing clutch 12, simultaneously energizing clutch 14, disengaging clutch 64, simultaneously engaging clutch 78, and maintaining clutch 114 engaged whereby power flows from clutch 14, output member 40, shaft 50, gear cluster 52, meshing gears 54 and 76, clutch 78, shaft 32, meshing gears 110 and 112, clutch 114, gear 116 and shaft 34.

A third forward speed is achieved upon the de-energization of clutch 14, simultaneous energization of clutch 12, disengagement of clutch 78, simultaneous engagement of clutch 60 and maintenance of clutch 114 engaged whereby power flows by way of clutch 12, output member 38, shaft 42, gear cluster 44, meshing gears 46 and 58, clutch 60, shaft 32, meshing gears 110 and 112, clutch 114, gear 116 and shaft 34.

Fourth speed of operation of the transmission is obtained by de-energizing clutch 12, simultaneously energizing clutch 82, and maintaining clutch 114 engaged whereby power flows by way of clutch 14, output member 40, shaft 50, gear cluster 52, meshing gears 56 and 80, clutch 82, shaft 32, meshing gears 110 and 112, clutch 114, gear 116 and shaft 34.

It is to be noted that throughout the first four forward speeds of operation of the transmission that the gear ratio of the auxiliary gear box has remained constant and it is thus only necessary to disengage clutch 114 and simultaneously engage clutch 120 in the auxiliary gear box to obtain forward speeds five through eight of the transmission wherein the same sequence of operation of clutches 12 and 14, and clutches 64, 78, 60 and 82 is had in connection therewith as occurred for speeds one through four.

Speeds five to eight and reverse speeds are obtained as set forth in the above-mentioned copending application but need not be described here. The present invention is used for clutches 78 and 82. It might also be used for clutches 60 and 64.

Fig. 2 of the present application is an enlarged sectional view through that portion of Fig. 1 enclosed in dot-dash lines. This discloses the details of the friction clutches 78 and 82. The friction clutches 60 and 64 are substantially identical with that which will be here described. The friction clutches 104, 114 and 120 are similar to one-half of the present disclosure of Fig. 2, namely, the equivalent of either clutch 78 or clutch 82.

Referring now to Fig. 2, the gear 76 has a hub 77 secured to it by a plurality of bolts 77a. This hub is free to rotate on intermediate shaft 32 on the plain bearing 32a. In like manner the gear 80 has a hub 81 to which the gear is secured by means of a plurality of bolts 81a. This hub is free to rotate on the shaft 32 on the plain bearing 32b. The common support member 92 is keyed to shaft 32 by means of the key 92a. The common support member 92 is provided with two annular cylinders facing in opposite directions from a common central partition wall 92b. In one of these cylinders there is slidingly positioned an annular piston 91. In the other cylinder, facing toward the left in Fig. 2, is slidingly fitted the annular piston 93. The piston 91, when moved toward the right in Fig. 2 in clutch engaging direction, causes driving frictional engagement between the annular plates 86 which are keyed to the hub 81 and the annular plates 90 which are keyed to the common support member 92. An abutment ring 90a held in the member 92 by a snap ring 90b forms an abutment to take the thrust of piston 91. Piston 93 when it moves toward the left as viewed in Fig. 2 in clutch engaging direction, causes driving friction engagement between the set of annular plates 84 keyed to the hub 77 and another set of annular plates 88 keyed to the common support member 92. An abutment ring 88a is held in member 92 by means of snap ring 88b and serves to take the thrust from piston 93 as it moves in clutch engaging direction. A series of helical springs 130 seated in a series of cylindrical pockets 131 in pistons 91 and 93 engage against abutment rings 132 fixed relative to the member 92 by means of snap rings 133 so as to normally urge the pistons 91 and 93 in clutch disengaging direction. One or more drive pins 92' rigid with partition 92b extend snugly but slidably into suitable openings in pistons 91 and 93 so as to permit endwise movement of these pistons while restricting rotation relative to member 92.

Means is provided to supply pressure fluid behind the pistons 91 and 93 to urge them in clutch engaging direction while the parts are rotating. Since these arrangements are almost identical for both piston 91 and 93, only that for piston 93 will be described in detail. Through the hollow central portion of shaft 32 there extends a pressure fluid conduit 134 which leads through radial passageway 135 to an annular port 136 which communicates with port 137 extending radially outwardly through shaft 32 and joining port 138 which is a passageway extending radially outwardly through member 92 and closed at its outer end by the plug 139. A short passageway 140 communicates between passageway 138 and the chamber 141 behind piston 93 so that pressure fluid in the chamber 141 will cause piston 93 to move toward the left as viewed in Fig. 2 against the urging of springs 130 so as to cause frictional driving engagement between the sets of plates 84 and 88.

A free poppet valve 142 is provided normally coacting with its seat 143 to hold the pressure fluid in chamber 141. This valve is freely slidable in a radially extending cylindrical opening of member 92, closed at its outer end by plug 144. Passageway 145 provides communication between chamber 141 and the radially outermost face of plug 142. Passage 146 provides fluid communication between chamber 141 and the radially innermost face of valve 142. A fluid passageway 147 leads radially outwardly through member 92 to provide free escape of liquid through passages 146 and 147 when poppet valve 142 is open, but the discharge passageway is closed when the poppet valve is in its closed position as indicated in Fig. 2. When the conduit 134 is connected to a source of pressure fluid and the pump is operating at its normal capacity, the pressures exerted on valve 142 through passages 145 and 146 hold the valve in its closed position. However, when the source of pressure fluid is cut off, then centrifugal force acting upon the poppet valve 142 will cause it to move radially outwardly to a position where it opens the passageway 147 thus allowing the pressure fluid to bleed away from chamber 141, after which springs 130 will disengage the clutch. This bleed-off valve is the invention of Harold C. Schindler and is disclosed and claimed in his copending application Serial No. 482,257, filed January 17, 1955.

Parts for operating piston 91, similar to those already described for piston 93 are given the same reference characters with a prime suffix and include pressure fluid supply conduit 134' leading through shaft 32 to passageway 135' annular port 136' and passages 137', 138' and 140' to chamber 141' where the pressure fluid will cause piston 91 to move toward the right as viewed in Fig. 2 so as to engage the clutch. The poppet valve 142' serves to bleed away the pressure fluid when the source 134' is disconnected.

Seals 148 and 149 seal chamber 141 against leakage past piston 93. Seals 148' and 149' serve the same function for piston 91. Seals 150 prevent leakage from port 136 along shaft 32 and seals 150' serve the same function for the port 136'.

It will be noted that the common support member 92 for the two clutches is keyed to shaft 32 and is straddled by the two input gears 54 and 56 of the cluster gear driven by shaft 50 in driving relationship to the gear cluster 52. This gives compactness and rigidity to the structure.

The common support member 92 acts as a cage for the two clutches 78 and 82. The member 92 holds the outer clutch plates which are the reaction members for the clutch assemblies. This makes the assembly of the two clutches self-contained and compact, with a single output driving member.

The floating input gear hub 77 is shaped so that it nests within the output member 92 and extends from a point toward the left of Fig. 2 to a position radially opposite the piston 93. This gives a maximum length bearing for the floating input gear 76 so that it may have the maximum stability.

What I claim is.

In combination, an input shaft having two input gears spaced axially along said shaft and drivingly connected therewith, an output shaft parallel to said input shaft and having two output gears spaced axially along said output shaft in positions to engage respectively said two input gears, said output gears being rotatively mounted on said output shaft, a common support member mounted in fixed position on said output shaft between said output gears, said support member drivingly connected with said output shaft, a plurality of annular plates surrounding said output shaft and having mountings on said support member for rotation therewith and for movement axially along said support member, a radially extending partition fixed midway of said support member, annular cup-shape cylinder chambers in said support member extending axially away from said partition in opposite directions, separate annular pistons reciprocably mounted one in each of said cylinders, means preventing relative rotation between said pistons and their respective cylinders, second annular plates surrounding said output shaft and having mountings on said output gears respectively for rotation therewith and for movement axially thereof, abutments on said support member opposite said plates, portions of said plates being engageable between said pistons and said abutments, there being two separate fluid passageways in said partition, said passageways communicating respectively with said cylinder chambers on opposite sides of said partition, there being two separate passageways through said output shaft, and there being registering ports between each of said shaft passageways and its associated one only of said partition passageways.

References Cited in the file of this patent

UNITED STATES PATENTS

| | | |
|---|---|---|
| 993,825 | Cramer | May 30, 1911 |
| 1,138,098 | Fornaca | May 4, 1915 |
| 2,050,520 | Carter | Aug. 11, 1936 |
| 2,430,799 | Aspinwall | Nov. 11, 1947 |
| 2,464,538 | Vanderzee | Mar. 5, 1949 |
| 2,488,540 | Hollingsworth | Nov. 22, 1949 |
| 2,712,140 | Curtis et al. | July 5, 1955 |